(12) United States Patent
Lee

(10) Patent No.: US 8,221,711 B1
(45) Date of Patent: Jul. 17, 2012

(54) NANOSORBENTS AND METHODS OF USE THEREOF

(75) Inventor: Kwangyeol Lee, Bellevue, WA (US)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 13/386,990

(22) PCT Filed: Sep. 13, 2011

(86) PCT No.: PCT/US2011/051336
§ 371 (c)(1),
(2), (4) Date: Jan. 25, 2012

(51) Int. Cl.
*B01D 53/64* (2006.01)
*B05D 1/18* (2006.01)
*B82Y 40/00* (2011.01)
*C09K 3/00* (2006.01)

(52) U.S. Cl. ............ 423/210; 423/508; 95/133; 95/134; 210/688; 977/762

(58) Field of Classification Search .................. 423/210, 423/508; 95/133, 134; 210/688; 977/762
See application file for complete search history.

(56) References Cited

U.S. PATENT DOCUMENTS

| | | | |
|---|---|---|---|
| 4,877,515 | A | 10/1989 | Audeh |
| 5,080,799 | A | 1/1992 | Yan |
| 6,258,334 | B1 | 7/2001 | Gadkaree et al. |
| 6,712,878 | B2 | 3/2004 | Chang et al. |
| 7,033,419 | B1 | 4/2006 | Granite et al. |
| 7,048,781 | B1 | 5/2006 | Lovell |
| 7,537,803 | B2 | 5/2009 | Wang et al. |
| 7,645,306 | B2 | 1/2010 | Kanazirev |
| 7,754,170 | B2 | 7/2010 | Chang et al. |
| 2005/0220714 | A1 | 10/2005 | Kauzlarich et al. |
| 2009/0145343 | A1 | 6/2009 | Mauldin et al. |
| 2009/0236563 | A1 | 9/2009 | Goan et al. |
| 2010/0230286 | A1* | 9/2010 | Lifchits .......................... 205/50 |
| 2011/0076841 | A1* | 3/2011 | Kahen .......................... 438/501 |

FOREIGN PATENT DOCUMENTS

| | | |
|---|---|---|
| WO | WO2004/035179 A1 | 4/2004 |
| WO | WO2009/108220 A1 | 9/2009 |

OTHER PUBLICATIONS

English abstract of KR 2010-073,892 A published on Jul. 1, 2010.*
International Search Report and Written Opinion of PCT/US2011/051336 dated Oct. 20, 2011.
Johnson et al., Mercury vapor release from broken compact fluorescent lamps and in situ capture by new nanomaterial sorbents, *Environ Sci Technol.* (Aug. 1, 2008), 42(15):5772-5778 (Abstract).
Lee et al., A nano-selenium reactive barrier approach for managing mercury over the life-cycle of compact fluorescent lamps, *Environ Sci Technol.* (Aug. 1, 2009), 43(15):5915-5920 (Abstract).
Lee et al., Osmium replica of mesoporous silicate MCM-48: efficient and reusable catalyst for oxidative cleavage and dihydroxylation reactions, *J Am Chem Soc.* (Jun. 11, 2003), 125(23):6844-6845.
Li et al., Elemental selenium particles at nano-size (Nano-Se) are more toxic to Medaka (Oryzias latipes) as a consequence of hyper-accumulation of selenium: a comparison with sodium selenite, *Aquat Toxicol.* (Sep. 29, 2008), 89(4):251-256.
Ugarte et al., Nanocapillarity and Chemistry in Carbon Nanotubes, *Science* (Dec. 13, 1996), 274(5294):1897-1899.
Tran et al., Selenium Filter and Removal of Mercury From Flue Gas, Department of Environmental Inorganic Chemistry, Chalmers University of Technology 412-96 Göteborg, Sweden, http://www.transjonic.se/Hg.htm (Printed from Internet Nov. 8, 2011).
Nanoselenium Cloth Capturing Mercury Vapor from Broken CFLs, http://www.azonano.com/news.aspx?newsID=6698 (Printed from Internet Nov. 8, 2011).
SBRP at Brown University, Project 6: Nanomaterial Design for Environmental Health and Safety, http://www.brown.edu/Research/SRP/project6.shtml (Printed from Internet Nov. 8, 2011).
Nanocs—Selenium Nanoparticles http://www.nanocs.com/Se_nanoparticles.htm (Printed from Internet Nov. 8, 2011).
Granite et al., Sorbents for Mercury Removal From Flue Gas, U.S. Department of Energy, Federal Energy Technology Center, Pittsburgh, Pennsylvania (Jan. 1998).
Li et al., High yield synthesis of selenium nanowires in water at room temperature, *Chem Commun (Camb)* (Mar. 7, 2006), (9):1006-1008 (Abstract).
Jiang et al., Direct synthesis of Se@CdSe nanocables and CdSe nanotubes by reacting cadmium salts with Se nanowires, *Adv Mater* (Oct. 2003), 15:1740-1743.
Sarin, Nano-Selenium: Novel Formulations for Biological and Environmental Applications, A Dissertation Submitted in Partial Fulfillment of the Requirements for the Degree of Doctor of Philosophy in the Division of Engineering at Brown University, Providence, Rhode Island (May 2010).
Granite et al., Novel Sorbents for Mercury Removal From Flue Gas, *Industrial and Engineering Chemistry* (Apr. 1, 2000), 39(4):1020-1029 (http://www.osti.gov/energycitations/product.biblio.jsp?osti_id=20062644) (Abstract).
Wang et al., Polymer coating/encapsulation of nanoparticles using a supercritical anti-solvent process, *J. of Supercritical Fluids* (Aug. 20, 2002), pp. 85-99.

* cited by examiner

*Primary Examiner* — Timothy Vanoy
(74) *Attorney, Agent, or Firm* — Pepper Hamilton LLP

(57) ABSTRACT

Compositions and methods for removing mercury and/or cadmium from samples containing mercury and/or cadmium or thought to contain mercury and/or cadmium are described. Selenium core-sheath compositions containing a selenium nanostructure core and a melt-resistant sheath can be used to remove mercury and/or cadmium from high-temperature environments.

23 Claims, No Drawings

NANOSORBENTS AND METHODS OF USE THEREOF

CLAIM OF PRIORITY

This application is a U.S. national stage filing under 35 U.S.C. §371 of International Application No. PCT/US2011/051336 filed Sep. 13, 2011 entitled "Nanosorbents and Methods of Use Thereof," the disclosure of which is incorporated by reference in its entirety.

FIELD

Methods and adsorbents for capturing and removing mercury and/or cadmium from samples are described. More particularly, nanoselenium based adsorbents and methods for their preparation and use are described.

BACKGROUND

Mercury is challenging to capture and can travel long distances causing severe environmental problems. Various techniques have been developed to capture and remove mercury species in flue gas from coal combustion. The flue gas contains a variety of gaseous components such as $SO_x$, $NO_x$, $CO_2$, $O_2$, HCl, $H_2O$, etc, in addition to mercury. The presence of other gases can interfere with the reaction of an adsorbent with mercury species, and therefore, the adsorbent should possess extremely high selectivity and reactivity for mercury. One such absorbent is selenium or nanoselenium due to very strong mercury-selenium bonding.

The optimal operating temperature range for nanoselenium, both in nanoparticle and nanowire forms, is much lower than the typical flue gas treatment temperature of greater than 200° C.). Therefore, during the delivery stage to the Hg capturing site, the nanoselenium adsorbent inevitably experiences high temperatures. The structural integrity of nanoselenium, therefore, cannot be maintained at high temperatures due to the melting point of bulk selenium, which is 217° C. For nanoselenium the melting temperature is even lower. Therefore, at the temperatures at which nanoselenium would be exposed to mercury, there would be decreased surface area due to the melting of the nanoselenium. The decrease in surface area leads to decreased ability to capture and remove mercury. Although the temperature could be decreased to avoid the melting of the nanoselenium, a lower temperature would lead to less mercury being captured because at lower temperatures the absorbent is not as reactive.

Therefore, there is a need to develop a composition that can bind to and remove mercury from a sample at high temperatures without the limitations described above. Additionally, there is a need for a composition that can bind and remove mercury from a sample that can maintain its structural integrity while capturing and removing the mercury and that the integrity is maintained at high temperatures.

SUMMARY

In some embodiments, a selenium core-sheath composition comprising a selenium nanostructure core; and a melt-resistant sheath enveloping at least a portion of the selenium nanostructure core is provided. In some embodiments, the melt-resistant sheath has a melting point greater than that of selenium. In some embodiments, the melt-resistant sheath comprises a metal-selenide, a metal oxide, a silica-sol, or mixtures thereof. In some embodiments, the selenium nanostructure core is a nanowire. In some embodiments, the composition comprises a support structure in contact with the selenium core-sheath composition.

In some embodiments, the melt-resistant sheath fully envelops the selenium nanostructure core.

In some embodiments, methods of preparing a selenium core-sheath material are provided. In some embodiments, the method comprises contacting a selenium nanostructure with a metal salt, a metal oxide, or a silica-sol to form a composition; and maintaining the composition under conditions effective to form a selenium core-sheath material comprising a selenium nanostructure core and a melt-resistant sheath enveloping at least a portion of the selenium nanostructure core. In some embodiments, the method comprises absorbing the selenium core-sheath material onto a support structure.

In some embodiments, methods of removing mercury and/or cadmium from a sample are provided. In some embodiments, the method comprises providing a sample, suspected of, known to, or not known to contain mercury and/or cadmium; and contacting the untreated sample and a composition to form a treated sample, wherein the composition comprises a selenium core-sheath material comprising a selenium nanostructure core and a melt-resistant sheath enveloping at least a portion of the selenium nanostructure core. In some embodiments, the method generates a treated sample that has a concentration of mercury and/or cadmium in the treated sample that is less then the sample (e.g. untreated sample). In some embodiments, the sample has a temperature greater than the melting point of a selenium nanostructure core. In some embodiments, the sample is coal flue gas. In some embodiments, the selenium core-sheath material absorbs the mercury and/or cadmium in the untreated sample.

DETAILED DESCRIPTION

This description is not limited to the particular processes, compositions, or methodologies described, as these may vary. The terminology used in the description is for the purpose of describing the particular versions or embodiments only, and it is not intended to limit the scope of the embodiments described herein. Unless defined otherwise, all technical and scientific terms used herein have the same meanings as commonly understood by one of ordinary skill in the art. In some cases, terms with commonly understood meanings are defined herein for clarity and/or for ready reference, and the inclusion of such definitions herein should not necessarily be construed to represent a substantial difference over what is generally understood in the art. However, in case of conflict, the patent specification, including definitions, will prevail.

It must also be noted that as used herein and in the appended claims, the singular forms "a", "an", and "the" include plural reference unless the context clearly dictates otherwise. Thus, for example, reference to a "cell" is a reference to one or more cells and equivalents thereof known to those skilled in the art, and so forth.

As used in this document, terms "comprise," "have," and "include" and their conjugates, as used herein, mean "including but not limited to."

Materials

Embodiments provide a solution to the problem of removing mercury and/or cadmium from samples at high temperatures. Embodiments include compositions that can be used to remove mercury and/or cadmium from a sample. In some embodiments, the composition comprises a nanostructure core and a melt-resistant sheath enveloping at least a portion of the nanostructure core. In some embodiments, the nanostructure core comprises, consists essentially of, or consists of, nanoselenium. In some embodiments, a protective layer (e.g. sheath) is formed on the outermost surface of a nanostructure. The nanostructure can act as a nanoadsorbent to remove a contaminant, such as, but not limited to, mercury, cadmium, or a combination thereof from a sample. The protective layer can be porous or non-porous. In some embodiments, the protective layer is at least partially porous. The protective layer provides structural robustness (i.e. integrity) to the nanostructure. The protective layer, however, does not interfere with the reactive nature of the nanostructure. For example, the high surface/volume ratio of nanostructure is preserved, even at a high reaction temperature. Preserving the high surface/volume ratio allows the diffusion of atoms within the nanostructure even at high temperature, which allows high reactivity toward mercury and/or cadmium.

In some embodiments, compositions comprising a selenium structure core are provided. The selenium structure can be, for example, a nanostructure core. The core can be stabilized or made resistant to certain temperatures by encompassing or enveloping at least a portion of the selenium structure with a melt-resistant sheath. The sheath does not need to be melt-resistant at all temperatures. In some embodiments, the sheath is melt-resistant at a temperature that is greater than the melting temperature of the selenium structure core. In some embodiments, the sheath is melt-resistant at a temperature that is the same as the melting temperature of the selenium structure core.

The melting temperature of a core structure, such as the selenium structure, is the temperature at which the structure begins to break down and the overall structure is not maintained. For example, a selenium structure core will begin to melt and loose its overall structure when it is exposed to high temperatures that exist in coal flue. Although selenium is able to coordinate (e.g. capture) mercury and/or cadmium from coal flue, the high temperatures that normally exist in coal flue would inhibit this coordination because the selenium would lose its structure. This problem and disadvantage of using selenium is overcome by enveloping the selenium structure in a melt-resistant sheath, which can act as a protective layer. In some embodiments, the melt-resistant sheath envelops at least a portion of the selenium structure. In some embodiments, the melt resistant sheath envelops the entire selenium structure. In some embodiments, the melt resistant sheath is porous. In some embodiments, the melt resistant sheath is non-porous. The presently described methods can be used with a non-porous sheath. For example, complete coverage of the nanostructure structure with a metal-nanostructure, such as ZnSe, will not inhibit the reactivity of the protected (encapsulated) nanostructure. Without being bound to any theory, the reactivity is not inhibited because the metal-nanostructure will coalesce further at high temperatures, such as that of coal flue, which will rearrange the structure of the sheath. The rearranged structure still stabilizes the protected nanostructure, but the rearranged structure will lead to the exposure of melted nanostructure through the newly formed pores that are created as the structure of the sheath changes at high temperatures. A similar process will occur when the mercury and/or cadmium is removed from the sample. For example, Hg can be complexed with Se to form a HgSe structure, but this will not completely inhibit further capture because the HgSe structure will be modified at higher temperatures thereby continuing to expose Se to capture and remove additional mercury and/or cadmium from a sample.

In some embodiments, the melt-resistant sheath can be any material that has a melting point greater than that of selenium (bulk selenium has a melting point of 217 degrees C). This property will protect the nanoselenium and its structure from degrading. In some embodiments, the melt resistant sheath comprises a metal-selenide, a metal oxide, a silica-sol, or mixtures thereof. In some embodiments, the sheath comprises at least one metal. The sheath can also comprise a mixture of metals. Examples of metals include, but are not limited to, Zn, Ni, Ag, Cu, Pd, Hg, Cd, and Fe. In some embodiments, the metal is present in a cationic form. In some embodiments, the metal cationic form is a Zn cation, Ni cation, Ag cation, Cu cation, Pd cation, Hg cation, Cd cation, Fe cation, any combination thereof, and the like. In some embodiments, the metal cationic form is $Zn^{2+}$, $Hg^{2+}$, $Cd^{2+}$, $Fe^{2+}$, $Fe^{3+}$, $cu^{2+}$, $Ni^{2+}$, $Ag^{2+}$, $Pd^{2+}$, any combination thereof, and the like.

The sheath material can be selected at least in part based upon its melting temperature. By "melting-resistant" it is meant that the material maintains its overall structural integrity at the temperatures incurred during the process. As such, the sheath material will have a melting temperature not only greater than that of the nanostructure core (e.g. selenium at 217° C.) but also greater than the environment in which the adsorbent will be employed (e.g. flue gases >200° C.). Materials, blends, and alloys having a melting point greater than about 200° C., about 225° C., about 250° C., about 300° C., about 350° C. and ranges therebetween are well suited for this use.

As discussed herein, the selenium structure can be a nanostructure. The nanostructure can be any structure that provides stability and/or the ability for the selenium to coordinate mercury and/or cadmium. In some embodiments, the selenium nanostructure is a nanowire, nanorod, nanoribbon, nanotube, any combination thereof, and the like. In some embodiments, the diameter of the nanostructure is about 5-20, 5-30, 5-40, 5-50, 10-20, 10-30, 10-40, 10-50, 15-20, 15-30, 15-40, 15-50, 20-30, 20-40, 20-50, 30-40, 30-50, or 40-50 nm. In some embodiments, the diameter of the nanostructure is about 5, 10, 15, 20, 25, 30, 35, 40, 45, or 50 nm. The selenium nanostructure can be made by any method including, but not limited to, methods described herein.

In addition to the sheath and the selenium structure core, in some embodiments, a composition comprising a support structure in contact with a selenium core sheath composition, such as the compositions described herein, is provided. The support structure can be used to place the selenium structure on a support structure that can be then utilized in another structure, device, or a method of using the selenium support structure. Examples of support structures include, but are not limited to, filter paper, activated carbon, expanded graphite, silica (e.g. inorganic porous silica), alumina, any combination thereof, and the like. For example, a support structure such as filter paper can be placed in a flue so that the selenium structure that is in contact with the support structure can be placed in the path of the flue exhaust. The flue exhaust would come into contact with the support structure and the selenium structure core, which would allow the selenium structure to capture and remove the mercury and/or cadmium from the flue.

Therefore, in some embodiments, a composition comprising a selenium nanostructure core, a melt-resistant sheath, and a support structure is provided.

Methods of Preparation

The protective layer (e.g. melt-resistant sheath) can be prepared as described herein, and, for example, by reacting appropriate metal precursors on the nanostructure. In some embodiments, a metal precursor with a high melting point is used. The embodiments described herein surprisingly and unexpectedly address and solve the paradoxical problem of improving the reactivity of a nanostructure at the high temperatures required for effective mercury and/or cadmium capture. The nanostructure may be, but is not limited to, a selenium nanostructure, which is unstable by nature thus wants to form less reactive microstructures at the elevated temperatures required for effective mercury and/or cadmium capture. The disclosed embodiments solve this problem as well as others by, among other things, providing a method for structural fortification of the nanostructure as described herein.

In some embodiments, methods for stabilizing nanostructures at high temperatures are provided. The structure stabilization can be accomplished, for example, by forming a protective inorganic layer on the nanostructures. The melt-resistant nature of protective layer, which can also be referred to as a "sheath" can maintain the structure of the encased nanostructure even at temperatures above the melting point of the nanostructure. Without being bound to any theory the structure can be maintained by capillary force. The mercury and/or cadmium can then access the reactive nanostructure either through the pores of the protective layer or through diffusion if the protective layer has no pores or has areas that do not have pores. Once the mercury and/or cadmium and selenium are complexed with one another, HgSe will form on the surface of the nanostructure and the HgSe can act as an excellent container or protective layer for the melted selenium thereby further stabilizing the nano structure.

The protective layer can be created by a variety of methods including, but not limited to, forming any of a number of melting-resistant porous and protective sheaths on the surface of the nanostructure material. In some embodiments, the nanostructure material is nanoselenium. A metal-adsorbent sheath (e.g. metal-selenide) can be created by partial reaction of the nanostructure surface atoms with a metal. A metal sheath can be formed by salt reduction, and a metal oxide sheath can be created via a sol-gel method. Non-limiting examples of these methods are described herein, but other methods can also be used to create the protective layer.

In some embodiments, generating a porous protective layer is formed by a partial surface reaction on the nanostructure (e.g. nanoadsorbents). The partial surface reaction can lead to a porous protective layer, which creates a shape-unchanging nanostructure and high reactivity of the protected (e.g. encased) nanostructure through the pores that are generated using such a process. To generate a protective layer, in some embodiments, an aqueous dispersion of nanowires of the nanostructure (e.g. Se nanowires) is heated in the presence of at least one metal cation. This mixture creates a metal-nanostructure complex on the surface of the nanostructure. In some embodiments, a metal-nanostructure layer is formed by contacting the nanostructure with a high metal cation concentration and/or reacting the nanostructure with the metal for a long period of time allowing a complete reaction to occur. In some embodiments, a porous or patchy layer is formed. The porous layer can be formed, for example, by using a sub-maximal metal cation concentration and/or reacting the nanostructure material with the metal cation for a shorter period of time.

For example, in some embodiments, nanowires are dispersed in an alcohol, such as but not limited to, ethanol, and the solution is contacted with a metal salt solution, such as but not limited to zinc chloride. Other metals can be used including those described herein. In some embodiments, the molar ration between of the metal cation to the nanostructure material is about 1:1, 1:2, 2:1, and the like. The mixture can then be heated for a period of time and then allowed to cool. The mixture can also be vigorously stirred. After cooling a precipitate can be formed. The precipitate will be the nanostructure and a protective layer encompassing at least a portion of the nanostructure. The precipitate can be centrifuged, washed, dried, or any combination thereof. The resulting composition can, in some embodiments, be dispersed or adsorbed onto another support structure. The support structure can be any support structure including, but not limited to those described herein, and for example has a high surface area allowing a sufficient quantity of the composition to be deposited onto the support structure. The larger surface area can allow a greater amount of mercury and/or cadmium to be removed from a sample.

In addition, to various nanostructures, this method and the other methods described herein can be used to stabilize different types of nanoparticles or chalcogels. As discussed herein, other metals can be used to stabilize the nanostructure core, including but not limited to, $Hg^{2+}$, $Cd^{2+}$, $Fe^{2+}$, $Fe^{3+}$, $Cu^{2+}$, and the like. The synthesis of various nanowires and compositions are known and can be found, for example, in Wing-Wah Yam et al. *Chem. Commun.* 2006, 1006-1008; and Younan Xia et al. *Adv. Mater.* 2003, 15, 1740-1743.

The composition can generally be made according to any suitable method. In some embodiments, a method of preparing a selenium core-sheath material is provided. In some embodiments, the method comprises contacting a selenium structure (e.g. nanostructure) with a metal salt, a metal oxide, or a silica-sol to form a composition. In some embodiments, the method comprises maintaining the composition that is formed when a selenium structure is contacted with a metal salt, a metal oxide, or a silica-sol under conditions effective to form a selenium core-sheath material comprising a selenium nanostructure core and a melt-resistant sheath. In some embodiments, the conditions are sufficient to envelop at least a portion of the selenium nanostructure core. In some embodiments, the conditions are sufficient to envelop at least about 10, 20, 30, 40, 50, 60, 70, 80, 90, 95, or 99% of the selenium structure core. In some embodiments, the conditions are sufficient to fully envelop the selenium structure core. The conditions can be based upon length of time that the selenium structure is contacted with a metal salt, a metal oxide, or a silica-sol. The longer the time, the more of the selenium structure that will be enveloped by the sheath.

In some embodiments, the sheath or protective layer (e.g. formed from a metal, metal salt, or metal oxide) is formed at a temperature that is less than about 100 degrees Celsius. In some embodiments the temperature is about 80 to about 100 degrees Celsius. Specific examples of temperatures include about 50 degrees Celsius, about 60 degrees Celsius, about 70 degrees Celsius, about 80 degrees Celsius, about 90 degrees Celsius, about 100 degrees Celsius, and ranges between any two of these values.

In some embodiments, the contacting comprises mixing the selenium structure with a metal salt. In some embodiments, the contacting comprises heating and mixing the selenium structure with a metal salt. In some embodiments, the contacting comprises mixing the selenium nanostructure with a metal oxide. In some embodiments, the contacting comprises mixing the selenium structure with a silica-sol to form a selenium-silica-sol composition. In some embodiments, the selenium-silica-sol composition is an emulsion. The emulsion can be made according to various methods. For example, the emulsion can be made by generating an aqueous foam to which the selenium structure is added. The emulsion can then be heated and allowed to cool to generate a silica-sol gel. The generated silica-sol gel comprises the selenium structures.

In some embodiments, the foam is generated by, for example, vigorously stirring a surfactant solution at an acidic pH. In some embodiments, the surfactant is an aqueous surfactant. In some embodiments, the surfactant is, but not limited to, sodium dodecyl benzene, Additionally, any aqueous surfactant can be used in the described methods. In some embodiments, the pH of the surfactant solution is less than about 7, 6, 5, 4, 3, 2.5, or 2.0, or the pH may be within the ranges between any two of these values. In some embodiments, the pH is about 2-4, about 2, about 3, or about 4.

After a foam is generated, in some embodiments, the nanostructure can be added to the foam to generate a foam-nanostructure composition. In some embodiments, a detergent or non-ionic surfactant, such as, but not limited to, TRITON X-100 (polyethylene glycol p-(1,1,3,3-tetramethylbutyl)-phenyl ether) is added to the foam-nanostructure composition to create the emulsion. Other detergents or non-ionic surfactants can also be used. In some embodiments, tetraethyl orthosilicate (TEOS) is added to the emulsion to create an emulsion with TEOS solution. This solution can then be stirred for a period of time. After stirring for a period of time, the solution is allowed to set. Any organic solvents that have been used, such as, but not limited to, hexane, can be removed with heating to yield a silica-sol gel comprising the selenium structure. The silica-sol gel can, for example, comprise pores of various sizes. In some embodiments, the pores are about 0.1 µm to about 1.0 µm, about 0.1 µm to about 2.0 µm, about 0.1 µm to about 3.0 µm, or about 0.1 µm to about 4.0 µm. In some embodiments, the silica-sol gel is greater than or equal to about 70%, about 75%, about 80%, about 85%, about 90%, or about 95% porosity. In some embodiments, the silica-sol gel has about 70% to about 90%, about 70% to about 85%, about 75% to about 80%, or about 75% to about 85% porosity. The silica sol gel can be studded with the selenium structures. This material would allow the selenium structures to be stabilized at high temperatures and be able to coordinate, bind and/or remove mercury and/or cadmium from a sample.

The method can also comprise absorbing the selenium core-sheath material onto a support structure. Therefore, in some embodiments, the method comprises absorbing the selenium core-sheath material onto a support structure. The support structure can be any structure that is suitable to support the selenium composition including, but not limited to, any support structure described herein such as filter paper, activated carbon, expanded graphite, silica, alumina, and the like. Methods of absorbing the selenium core-sheath material onto a support structure are known to one of skill in the art.

Methods of Use

In some embodiments, methods of removing mercury and/or cadmium from a sample are provided. In some embodiments, the method comprises providing a sample and contacting the sample and a composition to form a treated sample. The treated sample then has at least a portion of mercury and/or cadmium removed from the sample. In some embodiments, the sample is untreated prior to being contacted with a composition, wherein the composition comprises a selenium core-sheath material comprising a selenium nanostructure core and a melt-resistant sheath. An untreated sample can refer to a sample that has not been treated for the purpose of removing mercury and/or cadmium. In some embodiments, the untreated sample is a sample that has not been treated or processed for the purpose of removing any contaminant or pollutant. The sample may, in some embodiments, have been treated to remove at least a portion of containments present in the sample. In some embodiments, the sample may be treated to remove at least a portion of mercury and/or cadmium before being contacted with the selenium structure core and sheath composition described herein. In some embodiments, the sample has not been treated to remove any mercury and/or cadmium before it is contacted with a selenium core-sheath composition comprising a selenium nanostructure core; and a melt-resistant sheath enveloping at least a portion of the selenium nanostructure core.

In some embodiments, the method results in a treated sample, wherein the concentration of mercury and/or cadmium in the untreated sample is higher than the concentration of the mercury and/or cadmium in the treated sample. In some embodiments, the treated sample comprises at least about 10%, 20%, 30%, 40%, 50%, 60%, 70%, 80%, 90%, 91%, 92%, 93%, 94%, 95%, 96%, 97%, 98%, or 99% less mercury and/or cadmium than the untreated sample. In some embodiments, the treated sample comprises about 100% or 100% less mercury and/or cadmium than the untreated sample (i.e., all mercury and/or cadmium was removed from the untreated sample, giving a treated sample that does not contain mercury and/or cadmium). In some embodiments, at least a portion of the mercury and/or cadmium is removed from the sample. In some embodiment at least about 10%, 20%, 30%, 40%, 50%, 60%, 70%, 80%, 90%, 91%, 92%, 93%, 94%, 95%, 96%, 97%, 98%, or 99% of the mercury and/or cadmium is removed from the untreated sample. In some embodiments, about 100% or 100% of the mercury and/or cadmium is removed from the untreated sample. In some embodiments, the selenium core-sheath material absorbs the mercury and/or cadmium from the untreated sample so that the concentration of mercury and/or cadmium in the treated sample is less than in the untreated sample.

The temperature of the untreated sample can be any temperature wherein upon contact with the compositions described herein can coordinate or remove mercury and/or cadmium from the untreated sample to form a treated sample with a concentration of mercury and/or cadmium that is less than the untreated sample. In some embodiments, the temperature of the sample is greater than the melting point of a selenium structure core. In some embodiments, the temperature of the sample is greater than or equal to the melting point of a selenium structure core. In some embodiments, the temperature of the sample is less than or equal to the melting point of a selenium structure core. In some embodiments, the temperature of the sample is about the same as the melting point of a selenium structure core. In some embodiments, the temperature of the sample is same as the melting point of a selenium structure core. In some embodiments, the temperature of the sample is equal to or greater than 217 degrees Celsius (the melting point of bulk selenium). In some embodiments, the method comprises heating the sample to increase the temperature such that the sample temperature is greater than the melting point of the selenium structure core. The temperature can be increased by any method, including, but not limited to, heating the sample to increase the temperature. In some embodiments, the temperature of the sample is greater than about 200, 210, 215, 216, 217, 220, or 230 degrees Celsius or within a range between any two of these temperatures.

The samples described herein can be any sample. In some embodiments, the sample comprises at least one contaminant or at least one pollutant. In some embodiments, the contaminant or pollutant is mercury, cadmium, or combination thereof. The mercury can be, for example, elemental mercury (e.g. Hg metal) or oxidized mercury (e.g. HgO). The cadmium can be, for example, elemental cadmium (e.g. Cd metal) or oxidized cadmium (e.g. CdO). In some embodiments, the sample is known to contain mercury and/or cadmium. In some embodiments, the sample is suspected of containing mercury and/or cadmium. In some embodiments, it is unknown whether the sample contains mercury and/or cadmium. In some embodiments, the sample is coal flue gas.

In some embodiments, the sample is coal flue gas that is generated when producing electricity.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

EXAMPLES

Example 1

Preparation of a Se Nanowire with ZnSe Sheath

Se Nanowires (1 g) are dispersed in 5 mL ethanol and are added into 250 mL flask containing 50 mL $ZnCl_2$ (molar ratio between $Zn^{2+}$ and Se is set to 1:1). The mixture is heated to about 80-100° C. for 3 hours under vigorous magnetic stirring, and then is cooled to room temperature. The dark precipitate obtained after centrifugation is further washed with ample amount of water and then dried. The obtained Se nanostructure core and melt-resistant sheath comprising ZnSe composition is then dispersed onto high surface area support structure assisted by sonication in water, dried, stored in ambient condition before usage.

Example 2

Removal of Hg from Coal Flue Gas with a Se Nanowire with ZnSe Sheath

The composition of Example 1 is adsorbed or absorbed onto a filter paper that acts a solid support structure. The filter paper is then inserted into a chimney through which the coal flue gas travels. The coal flue gas is allowed to pass through the support structure comprising the Se nanowire with ZnSe sheath. A portion of the mercury is removed from the coal flue gas. The treatment can be repeated with additional filters serially placed in the chimney path to remove at least 99% of the mercury present in the coal flue gas.

Example 3

Removal of Hg from Coal Flue Gas

The composition of Example 1 is adsorbed or absorbed onto activated carbon, which acts a solid support structure. The activated carbon is then inserted into a chimney through which the coal flue gas travels. The coal flue gas is allowed to pass through the support structure comprising the Se nanowire with ZnSe sheath. A portion of the mercury is removed from the coal flue gas. The treatment can be repeated with additional compositions containing the activated carbon serially placed in the chimney path to remove at least 99% of the mercury present in the coal flue gas.

Example 4

Removal of Hg from High Temperature Gas

A selenium core-sheath composition comprising a selenium nanostructure core; and a melt-resistant sheath enveloping at least a portion of the selenium nanostructure core is contacted with coal flue gas a temperature greater than 200 degrees Celsius. At least a portion of the mercury is removed from the coal flue gas.

Example 5

Removal of Cd from a Sample with a Se Nanowire with ZnSe Sheath

The composition of Example 1 is adsorbed or absorbed onto activated charcoal that acts a solid support structure. The activated charcoal is contacted with a sample containing cadmium under conditions where the cadmium can be bound by the nanowire. A portion of the cadmium is removed from the sample. The treatment can be repeated with additional amounts of activated charcoal to remove at least 99% of the cadmium present in the sample.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 members refers to groups having 1, 2, or 3 members. Similarly, a group having 1-5 members refers to groups having 1, 2, 3, 4, or 5 members, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting.

What is claimed is:

1. A selenium core-sheath composition comprising:
   a selenium nanostructure core comprising a selenium nanowire; and
   a melt-resistant sheath enveloping at least a portion of the selenium nanostructure core.

2. The composition of claim 1, wherein the melt-resistant sheath has a melting point greater than that of selenium, and comprises a metal-selenide, a metal oxide, a silica-sol, or mixtures thereof.

3. The composition of claim 1, wherein the melt-resistant sheath is porous.

4. The composition of claim 1, wherein the melt-resistant sheath comprises at least one metal selected from the group consisting of Zn, Ni, Ag, Cu, Pd, Hg, Cd, and Fe.

5. The composition of claim 1, wherein the melt-resistant sheath comprises at least one metal cation selected from the group consisting of Zn cation, Ni cation, Ag cation, Cu cation, Pd cation, Hg cation, Cd cation, and Fe cation.

6. The composition of claim 1, wherein the melt-resistant sheath comprises at least one metal cation selected from the group consisting of $Zn^{2+}$, $Hg^{2+}$, $Cd^{2+}$, $Fe^{2+}$, $Fe^{3+}$, $Cu^{2+}$, $Ni^{2+}$, $Ag^{2+}$, and $Pd^{2+}$.

7. The composition of claim 1, further comprising a support structure in contact with the selenium core-sheath composition.

8. The composition of claim 7, wherein the support structure is selected from filter paper, activated carbon, expanded graphite, silica, alumina, or any combination thereof.

9. The composition of claim 1, wherein the melt-resistant sheath fully envelops the selenium nanostructure core.

10. A method of preparing a selenium core-sheath material, the method comprising:
    contacting a selenium nanostructure with a metal salt, a metal oxide, or a silica-sol to form a composition, wherein the selenium nanostructure comprises a selenium nanowire; and
    maintaining the composition under conditions effective to form a selenium core-sheath material comprising a selenium nanostructure core and a melt-resistant sheath enveloping at least a portion of the selenium nanostructure core.

11. The method of claim 10, wherein the contacting comprises mixing the selenium nanostructure with a metal salt.

12. The method of claim 10, wherein the contacting comprises heating and mixing the selenium nanostructure with a metal salt.

13. The method of claim 10, wherein the contacting comprises mixing the selenium nanostructure with a metal oxide.

14. The method of claim 10, wherein the contacting comprises mixing the selenium nanostructure with a silica-sol to form a selenium-silica-sol composition.

15. The method of claim 14, wherein the selenium-silica-sol composition is an emulsion.

16. The method of claim 10, the method further comprising absorbing the selenium core-sheath material onto a support structure.

17. The method of claim 16, wherein the support structure is selected from the group consisting of filter paper, activated carbon, and expanded graphite.

18. A method of removing mercury and/or cadmium from a sample, the method comprising:
    providing an untreated sample suspected of containing mercury and/or cadmium; and
    contacting the untreated sample and a composition to form a treated sample, wherein the composition comprises a selenium core-sheath material comprising a selenium nanostructure core and a melt-resistant sheath enveloping at least a portion of the selenium nanostructure core.

19. The method of claim 18, wherein the concentration of mercury and/or cadmium in the untreated sample is higher than the concentration of the mercury and/or cadmium in the treated sample.

20. The method of claim 18, wherein the untreated sample has a temperature greater than the melting point of a selenium nanostructure core.

21. The method of claim 18, wherein the untreated sample has a temperature greater than about 200 degrees Celsius.

22. The method of claim 18, wherein the untreated sample is coal flue gas.

23. The method of claim 18, wherein the selenium core-sheath material absorbs the mercury and/or cadmium in the untreated sample.

* * * * *

UNITED STATES PATENT AND TRADEMARK OFFICE
CERTIFICATE OF CORRECTION

| | | |
|---|---|---|
| PATENT NO. | : 8,221,711 B1 | Page 1 of 1 |
| APPLICATION NO. | : 13/386990 | |
| DATED | : July 17, 2012 | |
| INVENTOR(S) | : Lee | |

It is certified that error appears in the above-identified patent and that said Letters Patent is hereby corrected as shown below:

In Column 1, Line 35, delete "200°C.)." and insert -- 200°C. --, therefor.

In Column 4, Line 11, delete "$cu^{2+}$," and insert -- $Cu^{2+}$, --, therefor.

In Column 5, Line 24, delete "nano structure." and insert -- nanostructure. --, therefor.

Signed and Sealed this
Twenty-third Day of October, 2012

David J. Kappos
*Director of the United States Patent and Trademark Office*